United States Patent Office 3,124,572
Patented Mar. 10, 1964

---

3,124,572
DERIVATIVES OF ISOPREGNANE
Eugene L. Woroch, Itasca, Ill., assignor to Abbott Laboratories, North Chicago, Ill., a corporation of Illinois
No Drawing. Filed Oct. 27, 1961, Ser. No. 148,030
9 Claims. (Cl. 260—239.55)

The present invention relates to new steroids and intermediates useful in their preparation; more particularly, it relates to steroids of the 17α-pregnane and 17α-pregn-5-ene series.

It has been found that steroids of the formula

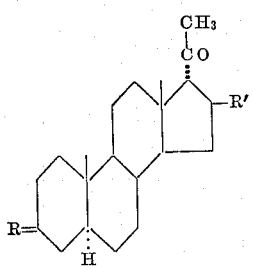

wherein R is oxygen or

and wherein R' is carboxy or hydroxymethyl, and steroids of the formula

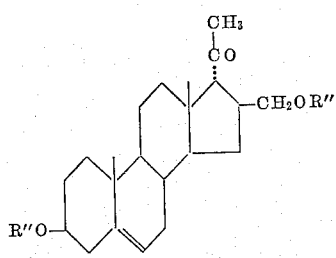

wherein each R'' is hydrogen or acetyl, are physiologically active compounds having androgenic effects. Also included in the scope of the present invention is the steroid intermediate of the formula

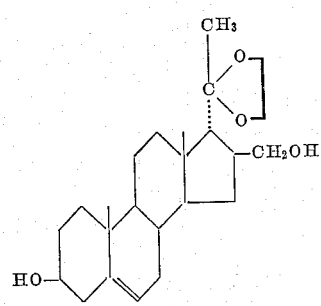

which is an essential precursor in the preparation of 16β-hydroxymethyl-17α-pregn-5-en-3β-ol-20-one and 16β-hydroxymethyl - 5α,17α - pregnan-3β-ol-20-one respectively, encompassed by the above formulas.

In a general outline, the preparation of the new steroids goes through the following steps: 16α-cyanopregn-5-en-3β-ol-20-one is hydrolyzed and isomerized by refluxing it for two hours in the presence of aqueous alcoholic alkali metal hydroxide to 16β-carboxy-17α-pregn-5-en-3β-ol-20-one. Treating 16β-carboxy-17α-pregn-5-en-3β-ol-20-one with ethylene glycol, β-hydroxyethyl 20-ethylenedioxy-17α-pregn-5-en-3β-ol-16β-carboxylate is obtained which upon reduction with lithium aluminum hydride gives 16β-hydroxymethyl - 20 - ethylenedioxy - 17α - pregn - 5 - en-3β-ol which in an acidic medium hydrolyzes to 16β-hydroxymethyl-17α-pregn-5-en-3β-ol-20-one. By hydrogenating 16β-carboxy-17α-pregn-5-en-3β-ol-20-one first with palladium, 16β-carboxy-5α,17α-pregnan-3β-ol-20-one is obtained which can be ketalyzed with simultaneous esterification, reduced, and subsequently hydrolyzed as above to yield 16β-hydroxymethyl-5α,17α-pregnan-3β-ol-20-one. The latter can also be obtained by hydrogenating 16β-hydroxymethyl-17α-pregn-5-en-3β-ol-20-one. By oxidizing 16β-carboxy-5α,17α-pregnan-3β-ol-20-one, the new compound 16β-carboxy-5α,17α-pregnane-3,20-dione is obtained, which can be carried through the same reactions outlined above to give 16β-hydroxymethyl-5α,17α-pregnane-3,20-dione.

The starting material for this new series of steroids, 16α-cyanopregn-5en-3β-ol-20-one, is made by the method described by J. Romo in Tetrahedron, 3, 39 (1958).

The following examples are given to illustrate the preparation of the above-identified compounds and are not meant to limit the invention in any respect.

EXAMPLE 1

16β-Carboxy-5α,17α-Pregnan-3β-Ol-20-One

A solution of 4.14 g. of 16β-carboxy-17α-pregn-5-en-3β-ol-20-one in 100 ml. of glacial acetic acid containing 1.0 ml. of water is hydrogenated in the presence of 1.24 g. of 5% palladium on charcoal. After completion of the hydrogen uptake, the slurry is filtered and the filtrate is diluted with 25 ml. of water. The aqueous solution is concentrated under reduced pressure and the residue is diluted with 100 ml. of water. The precipitated 16β-carboxy-5α,17α-pregnan-3β-ol-20-one is filtered, yielding 3.83 g. of crude material melting at 208–16° C. Upon recrystallization from acetone, 3.09 g. of 16β-carboxy-5α,17α-pregnan-3β-ol-20-one is obtained as colorless prisms. An analytical sample obtained by further recrystallizations from ethanol has a melting point of 223–4° C., an $[\alpha]_D^{24}$ of −40.8° (ethanol), and shows 72.84% C and 9.60% H, corresponding to the calculated values for $C_{22}H_{34}O_4$.

EXAMPLE 2

16β-Carboxy-5α,17α-Pregnane-3,20-Dione

A solution of 1.06 g. of 16β-carboxy-5α,17α-pregnan-3β-ol-20-one in 145 ml. of 95% aqueous acetic acid is treated with 8.76 ml. of an acetic acid solution of chromium trioxide containing 0.613 g. of chromium trioxide. After standing at room temperature for two hours, the solution is diluted with 200 ml. of water and filtered. The crystalline solid is dried, subsequently dissolved in methylene chloride, and filtered through diatomaceous earth to remove the insoluble chromium salts. Upon evaporating this solution to dryness under reduced pressure, 1.28 g. of crude, colorless 16β-carboxy-5α,17α-pregnane-3,20-dione melting at 233–7° C. is obtained. Recrystallization of this crude product from ether produces colorless prisms melting at 233–6° C. with an $[\alpha]_D^{25}$ of −35.5° (chloroform), and showing 73.28% C and 8.95% H, corresponding to the calculated values for $C_{22}H_{32}O_4$.

EXAMPLE 3

16β-Hydroxymethyl-5α,17α-Pregnane-3,20-Dione

A mixture of 1.36 g. of 16β-carboxy-5α,17α-pregnane-3,20-dione, 300 ml. of thiophen-free benzene, 35 ml. of ethylene glycol, and 300 mg. of p-toluenesulfonic acid monohydrate is refluxed four hours while removing water continuously with the aid of a Dean-Stark water separator. The resulting solution is cooled, poured into a 5% aqueous sodium bicarbonate solution, separated in a separating funnel, and washed with water. The organic layer is dried, concentrated in vacuo to a volume of 50 ml. and subsequently added dropwise to a stirred solution of 0.4 g. of lithium aluminum hydride in 150 ml. of dry ether. The suspension is stirred and refluxed four hours and allowed to stand overnight at room temperature. The excess lithium aluminum hydride is decomposed by cautiously adding 2.4 ml. of water while stirring. The inorganic salts are removed by filtration and the filter cake is washed with several portions of ether. The combined ether solutions are concentrated in vacuo to a viscous oil weighing 1.75 g. The oil is treated with 75 ml. of methanol and 12 ml. of 10% aqueous hydrochloric acid. This mixture is refluxed thirty minutes and subsequently the methanol is removed under reduced pressure. The residue is diluted with 200 ml. of water, whereupon 16β-hydroxymethyl-5α,17α-pregnane-3,20-dione precipitates. It is filtered and recrystallized from acetone, yielding 0.92 g. of product melting at 204–8° C. An analytical sample, obtained as colorless needles by further recrystallizations from acetone, melts at 205–207.5° C. and shows 76.44% C and 9.76% H, corresponding to the calculated values for $C_{22}H_{34}O_3$.

EXAMPLE 4

*16β-Hydroxymethyl-20-Ethylenedioxy-17α-Pregn-5-En-3β-Ol*

A mixture of 13.9 g. of 16β-carboxy-17α-pregn-5-en-3β-ol-20-one, 1000 ml. of dry, thiophen-free benzene, 100 ml. of ethylene glycol, and 0.8 g. of p-toluenesulfonic acid monohydrate is refluxed for 18 hours, while water is removed continuously with the aid of a Dean-Stark water separator. The resulting solution is cooled and poured into a saturated aqueous sodium bicarbonate solution. The organic layer is separated, washed with water, and mixed with a few milliliters of pyridine and concentrated in vacuo to produce a gelatinous residue. The infrared spectrum of this residue is consistent with the infrared pattern expected for the ketal ester β-hydroxyethyl 20-ethylenedioxy-17α-pregn-5-en-3β-ol-16β-carboxylate. The crude product is dissolved in 100 ml. of dry diethylene glycol dimethyl ether and this solution is added to a stirred solution of 8.0 g. of lithium aluminum hydride in 400 ml. of diethylene glycol dimethyl ether. After stirring this mixture at 65° C. for three hours, the white suspension is allowed to stand for 65 hours, and is thereafter stirred again for three hours at 65° C. The mixture is worked up as in Example 3 and the ether extracts are concentrated in vacuo to a volume of about 200 ml. The product which is precipitated by the slow addition of 2000 ml. of water is filtered and dried, yielding 15.3 g. of an amorphous solid. This product is recrystallized from benzene, yielding, in two crops, 9.25 g. of 16β-hydroxymethyl - 20 - ethylenedioxy - 17α - pregn - 5 - en - 3β-ol melting at 200–10° C. Upon recrystallization from benzene, 6.7 g. of pure material is obtained. An analytical sample of colorless prisms, melting at 228.5–231.5° C. (in vacuo) has an $[\alpha]_D^{27}$ of −116° (chloroform), and shows 73.70% C and 9.55% H, corresponding to the calculated values for $C_{24}H_{38}O_4$.

EXAMPLE 5

*16β-Hydroxymethyl-17α-Pregn-5-En-3β-Ol-20-One*

A solution containing 1.0 g. of 16β-hydroxymethyl-20-ethylenedioxy-17α-pregn-5-en-3β-ol, 50 ml. of acetone, and 10 ml. of 10% aqueous hydrochloric acid is allowed to stand at room temperature for two hours. The solution is concentrated and the slurry diluted with 200 ml. of water. The formed precipitate is filtered, dried, and recrystallized from acetone, yielding 0.667 g. of 16β-hydroxymethyl - 17α - pregn - 5 - en - 3β - ol - 20 - one as colorless prisms melting at 249–251.5° C. An analytical sample melts at 253° C. (in vacuo), has an $[\alpha]_D^{24}$ of −110° (ethanol), and shows 76.49% C, 9.67% H, and 13.76% O, corresponding to the calculated values for $C_{22}H_{34}O_2$.

EXAMPLE 6

*16β-Hydroxymethyl-5α,17α-Pregnan-3β-Ol-20-One*

A solution of 1.25 g. of 16β-hydroxymethyl-17α-pregn-5-en-3β-ol-20-one in 50 ml. of acetic acid containing 1 ml. of water is hydrogenated in the presence of 0.375 g. of 5% palladium on charcoal. After the hydrogen uptake ceases, the catalyst is filtered and the filtrate concentrated in vacuo to 20 ml. after first adding 10 ml. of water. The residue is slowly diluted with 200 ml. of water and the precipitate is filtered and dried, yielding 1.17 g. of crude 16β - hydroxymethyl - 5α,17α - pregnan - 3β - ol-20-one. The product is recrystallized from ethanol/water resulting in colorless plates melting at 213–20° C. (in vacuo). A sample is sublimed at 160–90° C. and 0.5 mm. pressure, producing colorless crystals melting at 222–24° C. (in vacuo). The product has an $[\alpha]_D^{24}$ of −74.6° (ethanol), and an analytical sample shows 76.06% C and 10.38% H, corresponding to the calculated values for $C_{22}H_{36}O_3$.

EXAMPLE 7

*3β-Acetoxy-16β-Acetoxymethyl-17α-Pregn-5-En-20-One*

A 0.2 g. sample of 16β-hydroxymethyl-17α-pregn-4-en-3β-ol-20-one is mixed with 10 cc. of acetic anhydride and 10 cc. of pyridine. The solution is allowed to stand over night at room temperature. The excess acetic anhydride is decomposed by the addition of ice and water and the crude 3β-acetoxy-16β-acetoxymethyl-17α-pregn-5-en-20-one is separated by filtration. After washing the filter-cake with water and drying, a yield of 0.2 g. 3β-acetoxy-16β-acetoxymethyl-17α-pregn-5-en-20-one is obtained. A purified sample, obtained in colorless, flat prisms from ethanol/water melts at 111–13° C.

By selective hydrolysis of the above 3β-acetoxy-16β-acetoxymethyl-17α-pregn-5-en-20-one as an alcoholic solution with dilute, aqueous potassium bicarbonate, 3β-acetoxy - 16β - hydroxymethyl - 17α - pregn - 5 - en - 20-one is obtained.

In all of the above examples the assigned structures are in agreement with the expected ultra violet and infrared spectra.

The steroids of the present invention are all useful for hormonal activities in warm-blooded animals. They are androgens with secondary activity as anabolic and Na-diuretic agents. They have low toxicity and good therapeutic ratios. Furthermore, the new steroids can be used as starting materials in the preparation of other compounds of the 17α-pregnane and 17α-pregn-5-ene series which in turn have useful endocrine activity.

Others may practice the invention in any of the numerous ways which will be suggested to one skilled in the art by the present disclosure. All such practice of the invention is considered to be a part hereof provided it falls within the scope of the appended claims.

I claim:

1. Steroids of the formula

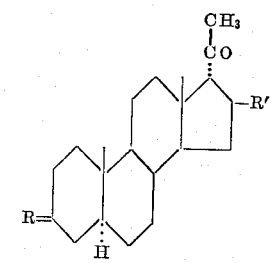

wherein R is selected from the group consisting of oxygen and

and wherein R' is selected from the group consisting of CH₂OH and COOH.

2. 16β-hydroxymethyl-5α,17α-pregnan-3β-ol-20-one.
3. 16β-hydroxymethyl-5α,17α-pregnane-3,20-dione.
4. 16β-carboxy-5α,17α-pregnan-3β-ol-20-one.
5. 16β-carboxy-5α,17α-pregnane-3,20-dione.
6. 3β-acetoxy-16β-acetoxymethyl-17α-pregn-5-en-20-one.
7. 16β-hydroxymethyl-20-ethylenedioxy-17α-pregn-5-en-3β-ol.
8. The method of preparing 16β-hydroxymethyl-17α-pregn-5-en-3β-ol-20-one, comprising the steps of:
   treating 16β-carboxy-17α-pregn-5-en-3β-ol-20-one with ethylene glycol in an inert organic solvent,
   removing water from the reaction mixture,
   separating β-hydroxyethyl 20-ethylenedioxy-17α-pregn-5-en-3β-ol-16β-carboxylate,
   reducing said β-hydroxyethyl 20-ethylenedioxy-17α-pregn-5-en-3β-ol-16β-carboxylate with lithium aluminum hydride, and
   hydrolyzing the obtained 16β-hydroxymethyl-20-ethylenedioxy-17α-pregn-5-en-3β-ol under acidic conditions.
9. The method of preparing 16β-hydroxymethyl-5α,17α-pregnane-3,20-dione comprising the steps of:
   treating 16β-carboxy-5α,17α-pregnane-3,20-dione with ethylene glycol in an inert organic solvent,
   removing water from the reaction mixture,
   reducing the obtained intermediate with lithium aluminum hydride, and
   hydrolyzing the obtained 16β-hydroxymethyl-3,20-bis-(ethylenedioxy)-5α,17α-pregnane under acidic conditions.

References Cited in the file of this patent
UNITED STATES PATENTS 2,822,381    Dodson et al. _____ Feb. 4, 1958
2,992,217    Armeria _____ July 11, 1961

OTHER REFERENCES

Loewenthal: Tetrahedron (1959), pp. 269 and 295.
Elks: J.C.S. (London), August 1960, pp. 3333–3340.